United States Patent
Grimbergen

(10) Patent No.: US 7,164,688 B2
(45) Date of Patent: Jan. 16, 2007

(54) TRANSPORTING A GIGABIT PER SECOND DATA STREAM OVER A SDH/SONET NETWORK

(75) Inventor: S. P Grimbergen, Leusden (NL)

(73) Assignee: Lucent Technologies Inc., Murray Hill, NJ (US)

( * ) Notice: Subject to any disclaimer, the term of this patent is extended or adjusted under 35 U.S.C. 154(b) by 1081 days.

(21) Appl. No.: 10/113,753

(22) Filed: Apr. 1, 2002

(65) Prior Publication Data

US 2002/0163939 A1  Nov. 7, 2002

(30) Foreign Application Priority Data

Apr. 2, 2001 (EP) .................................. 01303142

(51) Int. Cl.
*H04L 12/28* (2006.01)
*H04L 12/50* (2006.01)

(52) U.S. Cl. .................. 370/412; 370/395.1; 370/382; 370/391

(58) Field of Classification Search ................ 370/532, 370/474, 397, 401, 402, 403, 468, 358, 476, 370/230, 404, 405, 535, 542
See application file for complete search history.

(56) References Cited

U.S. PATENT DOCUMENTS

| | | | | |
|---|---|---|---|---|
| 6,526,069 B1 * | 2/2003 | Wolf et al. | .................. | 370/503 |
| 6,636,529 B1 * | 10/2003 | Goodman et al. | .......... | 370/469 |
| 6,917,630 B1 * | 7/2005 | Russell et al. | .............. | 370/532 |
| 6,996,125 B1 * | 2/2006 | Kfir et al. | .................... | 370/466 |

FOREIGN PATENT DOCUMENTS

| | | |
|---|---|---|
| DE | 199 03 366 A1 | 1/1999 |
| EP | 0964 543 A2 | 12/1999 |
| EP | 1069718 A2 | 1/2001 |
| WO | WO 00/36874 | 6/2000 |
| WO | WO 00/74286 A1 | 12/2000 |
| WO | WO 00/77960 A1 | 12/2000 |

OTHER PUBLICATIONS

A Proposal for SONET Standards on Virtual Concatenation of High Order and Low Order SPEs by S. Chen Jan. 17, 2000.
Transparent Mappings into SONET Paths for Block-Coded Data Formats by M. Mayer Jul. 10, 2000.

* cited by examiner

*Primary Examiner*—Hanh Nguyen

(57) ABSTRACT

A data stream having a bit rate of R gigabits per second (R=1 or an integer power of 2) is transported over a synchronous network using virtual concatenation. A prescribed number of channels (e.g., 7 for SDH, 21 for SONET) are allocated for transmitting streams of containers over the network. A block of data from the data stream is distributed over a group of containers of several channels. Received containers are stored in a memory until bytes from all containers from one of the blocks have been received. Memory is addressed with an address having a first set of bits determined by a position of the container in the stream of containers and a second set of bits determined from an offset determined by a position of the information in the container added to a base address for a channel from which the container was received.

16 Claims, 3 Drawing Sheets

TRANSPORTING A GIGABIT PER SECOND DATA STREAM OVER A SDH/SONET NETWORK

CROSS-REFERENCE TO RELATED APPLICATION

This application claims the benefit of priority from corresponding European Application Serial No. 01303142.2, filed Apr. 2, 2001.

TECHNICAL FIELD

The invention relates to a method of transporting a data stream over a SONET or SDH network, a method of receiving such a data stream, a telephone network system, a telephone exchange arranged to receive such a data stream, and an interface circuit pack for receiving such a data stream.

BACKROUND OF THE INVENTION

From the well-known ITU-T standards documents G.707 and G.783, it is known to transport data streams over a SDH/SONET network. This is realized by means of virtual concatenation. In particular, a number of channels are allocated, each for transporting a stream of containers, wherein each stream transports a container in each frame of 125 microseconds. In the SDH protocol, each container, which is commonly referred to as a VC4, contains 2340 bytes. In the SONET protocol, each container, which is commonly referred to as STS-1, contains 774 bytes.

This technique can be used to transport data from, for example, an Ethernet data stream in parallel via a group of containers from different channels. In the case of SDH, a group of 7 containers would have to be used to realize the data rate of 1 gigabits per second. In case of SONET, a group of 21 containers would have to be used to realize this data rate of 1 gigabits per second. Data from the Ethernet is split up and written into the containers, which are transported individually over the network.

Containers from different channels can suffer different delays. To compensate for this delay, a memory may be provided at a sink side of the network. The memory buffers each container until bytes from all containers from the group to which a container belongs have been received. For example, if up to a 32 millisecond difference in delays has to be compensated for, 256 frames need to be stored.

SUMMARY OF THE INVENTION

The shortcomings of the prior art transport techniques are overcome, according to the principles of the invention, by transporting a data stream over a SDH or SONET network using virtual concatenation, the data stream having a bit rate of R gigabits per second, R being equal to 1 or an integer power of 2. More specifically, R times 7 or 21 channels are allocated for transmitting streams of containers over the SDH or SONET network respectively. The data stream is split into blocks, such that bytes of each block are distributed over a group of containers of several channels, and the containers are transported over the SDH or SONET network. Upon receiving the containers from the channels, information from the containers is stored in a memory for retrieval once bytes from all containers for the block have been received. The memory is addressed with an address having a first set of bits determined by a position of the container in the stream of containers and a second set of bits determined from an offset determined by a position of the information in the container added to a base address for a channel from which the container was received. Base addresses for a set of 7 or 21 different channels (SDH and SONET respectively) are spaced by an address distance equal to the minimum range needed for storing a container in memory.

Illustratively, the principles of the invention are applicable in a network that supports both SONET and SDH, or in a SONET-only network, or in an SDH-only network. According to one aspect of the invention, I have discovered that the minimum amount of space needed to store one of the groups for a 1 gigabit per second bit stream happens to be slightly smaller than a power of 2, e.g., in the case of a group of seven 2340-byte VC4 containers in SDH, 16380 bytes are needed, which is only slightly less than $2^{14}$. In the case of a group of twenty-one (21) 774-bit STS1 containers in SONET, 16254 bytes are needed, which is also only slightly less than $2^{14}$.

Accordingly, when information from a container is stored, the address for the memory can be calculated in a simple manner and without much loss of memory space by storing information from each group contiguously, leaving a small gap between groups, corresponding to the discrepancy between the group size and the next power of two. This makes it possible to realize the composition of the address from the group position on one hand and the channel number and position in the container on the other hand is realized simply by juxtaposing two sets of address bits. Only the composition of the channel number and position in the container requires an addition or successive incrementations.

The principles of the invention can be easily applied to data streams with a bit rate of R gigabits per second, where R is an integer power of 2 (R=2**M). In this case, R times 7 or 21 streams of containers will be used for SDH and SONET, respectively. In this case, the M least significant bits of the channel identification (hereinafter "ID") may be used directly as address bits for the memory (i.e. without addition to the offset) and maintaining the same efficient use of memory as in the case of the 1 gigabit per second data rate. The higher significant bits of the channel ID can be used to select a base address, as described for the 1 gigabit per second case, which is arithmetically added to the offset.

BRIEF DESCRIPTION OF THE DRAWING

A more complete understanding of the invention may be obtained from consideration of the following detailed description of the invention in conjunction with the drawing, with like elements referenced with like reference numerals, in which.

DETAILED DESCRIPTION

Various embodiments of the invention are described herein relating to a method of transporting data, a method of receiving data, a system and a telephone exchange, and an interface circuit pack that allows efficient use of the memory, while keeping the addressing relatively simple. However, it should be noted that the embodiments shown and described herein are only meant to be illustrative and not limiting.

Figure 1:
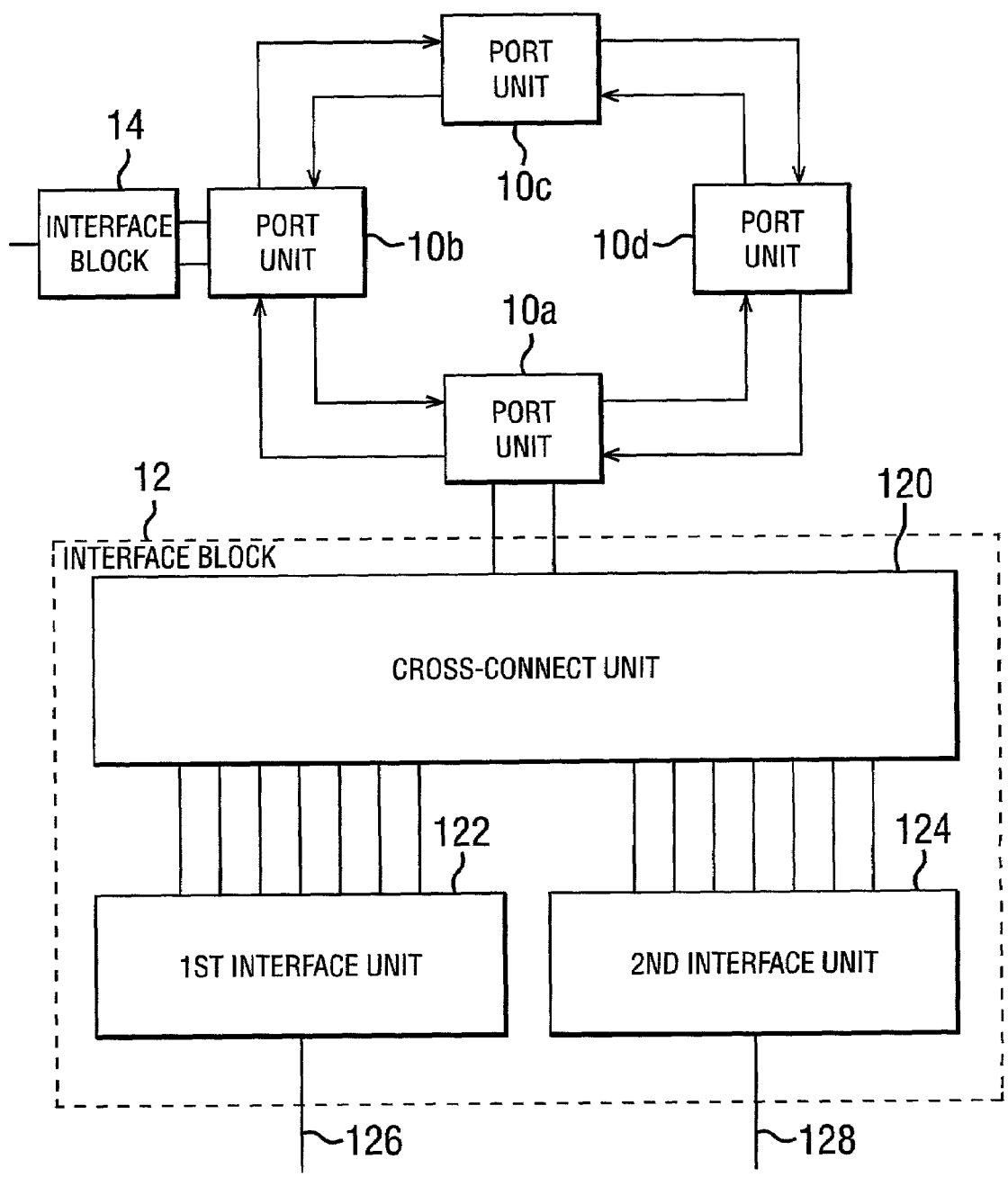
FIG. 1 shows a telephone network system according to an illustrative embodiment of the invention.

FIG. 1 shows a telephone network system according to one illustrative embodiment of the invention. For the purpose of illustration, the system is shown to contain four port units 10a–d connected in a ring topology, in which containers of bytes can be passed from one port unit 10a–d in clockwise and counter-clockwise directions. By way of example, two of the port units, 10a and 10b, are shown to be connected to interface blocks 12 and 14, respectively, but other interface blocks may be connected to the other port units (10c, 10d) and/or to the same port units (10a, 10b), and so on.

A receiving part of exemplary interface block 12 is shown in more detail. More specifically, interface block 12 includes cross-connect unit 120 and first and second interface units 122 and 124, respectively. Cross-connect unit 120 has a two-way connection to port unit 10a. Interface units 122 and 124 have connections to cross-connect unit 120 and to outside signal input/outputs 126 and 128, respectively.

In operation, information is transported through the ring topology, using the SONET and/or SDH protocol. The invention may be used in a network that supports both SONET and SDH, in a SONET-only network, or in an SDH-only network. Information is fed into the network or extracted from the network at portunits 10a–d via interface blocks 12 and 14. In interface block 12, cross-connect unit 120 extracts a signal, e.g., an OC-48 signal in the case of the SONET protocol or an STM-16 signal in the case of the SDH protocol. The OC-48 signal produces 48 streams of STS containers, outputting 48 containers of 774 bytes for 48 different streams in every frame of 125 microseconds. The STM-16 signal produces 16 streams of VC4 containers, outputting 16 containers of 2340 bytes for 16 different streams in every frame of 125 microseconds.

Cross-connect unit 120 outputs information from the streams of containers to the various interface units 122 and 124. More than one stream may be output to the same interface unit. By way of example, FIG. 1 shows the exemplary case of output of VC4 containers for a 1 gigabit Ethernet interface, where seven streams are output from cross-connect unit 120 to first interface unit 122. A similar number of streams may be output to second interface unit 124.

Interface units 122 and 124 contain circuits for sending and receiving data via the network. The circuits for sending, which are known per se, will not be described herein, since they are not material for understanding the invention. Basically, the circuits for sending ensure that data bytes of a 1 gigabit per second data stream are fed to the inputs for respective ones of a group of streams of containers and sent via the network, where different streams may be transported along different paths, so that these bytes may arrive at their destination with different delays.

Figure 2:
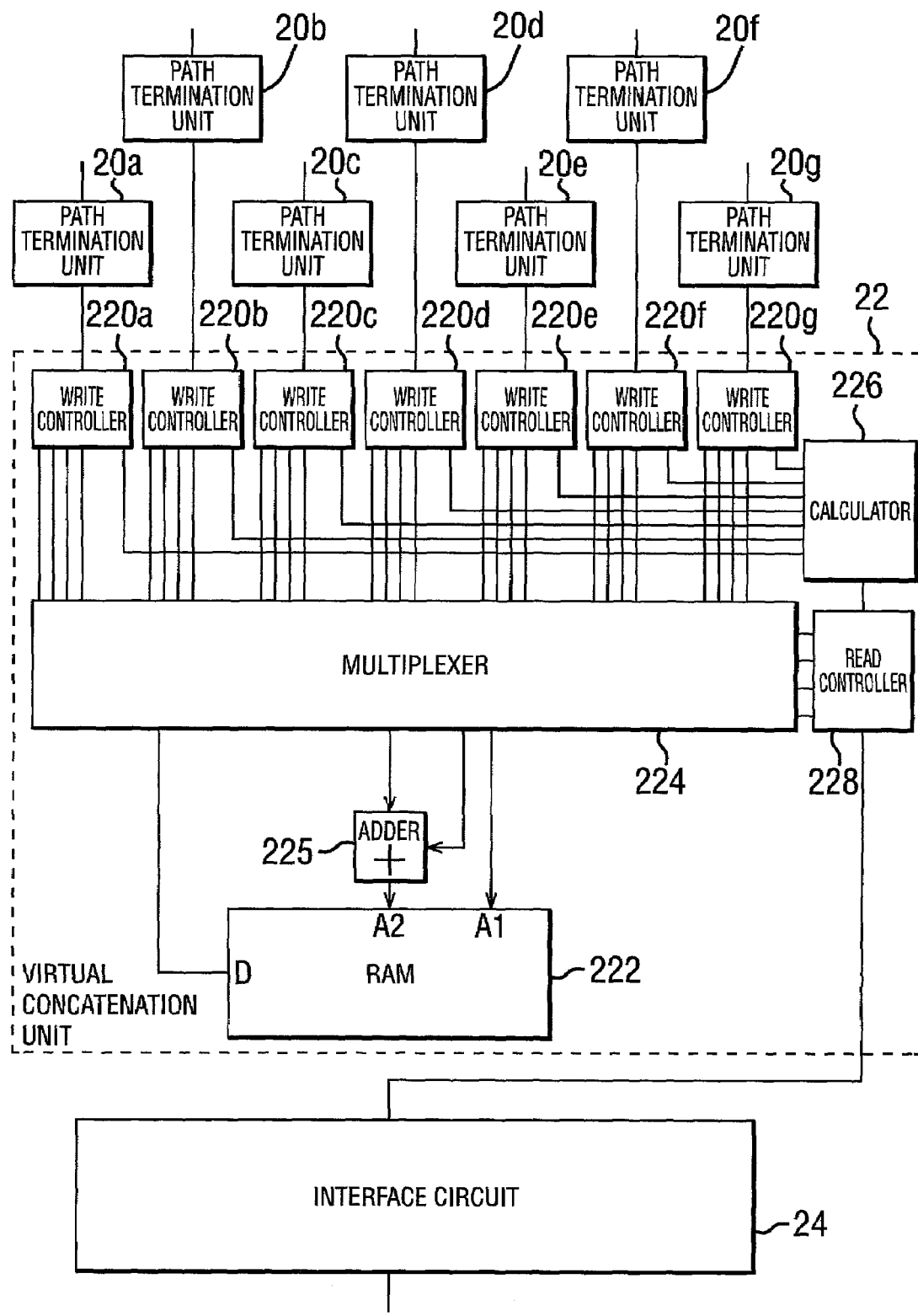
FIG. 2 shows a buffer unit according to an illustrative embodiment of the invention.

FIG. 2 shows a receiving part of the first interface unit 122 in more detail. Interface unit 122 contains a plurality of SDH/SONET path termination units 20a–20g (seven in the case of SDH and 21 in the case of SONET), a virtual concatenation unit 22 and a gigabit Ethernet interface circuit 24. Path termination units 20a–20g have inputs connected to cross-connect unit 120 (not shown) and outputs connected to virtual concatenation unit 22. Virtual concatenation unit 22 is coupled to the gigabit Ethernet interface circuit 24.

Virtual concatenation unit 22 includes a plurality of write controllers 220a–220g, RAM memory 222, access multiplexer 224, adder 225, differential delay calculator 226, and read controller 228. Write controllers 220a–220g each receive an input from a respective one of path termination units 20a–20g, and have outputs coupled to RAM memory 222 via access multiplexer 224 and adder 225 and to differential delay calculator 226. Differential delay calculator 226 has an output coupled to read controller 228, which is coupled to RAM memory 222 via access multiplexer 224 and adder 225.

Figure 3:
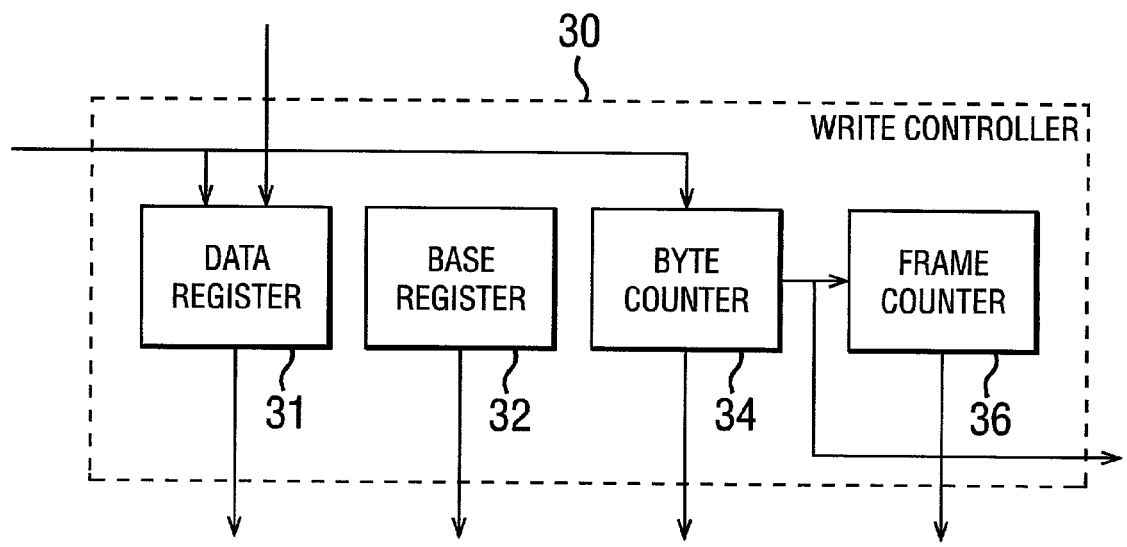
FIG. 3 shows a write controller according to an illustrative embodiment of the invention.

FIG. 3 shows the structure of a write controller 30 in more detail. More specifically, write controller 30 contains data register 31, container stream base register 32, byte counter 34, and frame counter 36. Data register 31 receives data from a path termination unit 20a–20g (not shown) and outputs data to access multiplexer 224 (not shown). Byte counter 34 has a byte count output coupled to access multiplexer 224 (not shown) and an overflow output coupled to frame counter 36 and differential delay calculator 226 (not shown). Frame counter 36 has a frame count output coupled to access multiplexer 224 (not shown). Byte counter 34 and data register 31 are clocked by a byte clock from cross-connect unit 120 (not shown).

In operation, each path termination unit 20a–20g receives and outputs the bytes from a respective one of the streams of containers. These bytes are stored successively in data register 31. Byte counter 34 counts the position in a container of the byte currently stored in data register 31. Frame counter 36 counts the position of the container in the stream of containers. Base register 32 stores a base value, which is specific to the stream for which the write controller 30 is provided. In principle, write controllers 220a–g (FIG. 2) are substantially identical, except that different base values are stored in base registers 32 of write controllers 220a–220g for different streams of containers. The base values for different write controllers 220a–220g are spaced by the number of memory locations D needed to store the bytes from a container, that is by D=2340 byte addresses in the case of a VC4 container (SDH) and by D=774 byte addresses in the case of a STS-1 container (SONET). For example, the base values are equal to D*i, where i is an integer number (0, 1, 2, 3 . . . 6 for SDH and 0, 1, 2, . . . 20 for SONET) specific to write control unit 220a–220g. Once the content B of byte counter 34 has reached a value indicating a final position in the container, byte counter 34 is reset and signals frame counter 36 to increase its content F (which indicates the position of the container in the stream). Also, byte counter 34 signals to differential delay calculator 226 that all bytes of the container have been received.

Access multiplexer 224 alternately gives each of write controllers 220a–220g access to RAM memory 222. When an access controller 220a–220g is given access, an address for RAM memory 222 is formed which comprises a number of bits. A first part of the bits is provided by frame counter 36 of write controller 30 that has access. A second part of the bits is provided by the adder 225. Adder 225 arithmetically adds the contents of the byte counter 34 to that of base register 32. The sum provides the second part of the address for RAM memory 222. The data from the data register of the writer controller 220a–220g that has access is written into memory at the location addressed by the address.

Thus, the address is generated with a minimum amount of arithmetic operations, because the first and second part of the bits are simply juxtaposed, not arithmetically added. This makes the determination of the address faster and less hardware intensive at the expense of a relatively small amount of memory space.

For example, if the first part of the address is a more significant part of the address (all except the 14 least significant bits) and the second part of the address is a less significant part (least significant 14 bits), the address is (F,B+i*D). Thus, a small part of the memory will be left unused, since the maximum value of B+i*D is 16379 in the case of SDH (D=2340, i at most 6 and B at most 2339) and 16253 in the case of SONET (D=774, i at most 20 and B at most 773). This means that memory locations with memory addresses from 16380 to 16384 (2 to the power 14) in the case of SDH and from 16253 to 16384 in the case of SONET will be left unused.

It will be appreciated that this distribution of address bits over a more significant part and a less significant part of the address is for illustration purposes only. In practice, any distribution of the bits over the address may be chosen.

Figure 4:
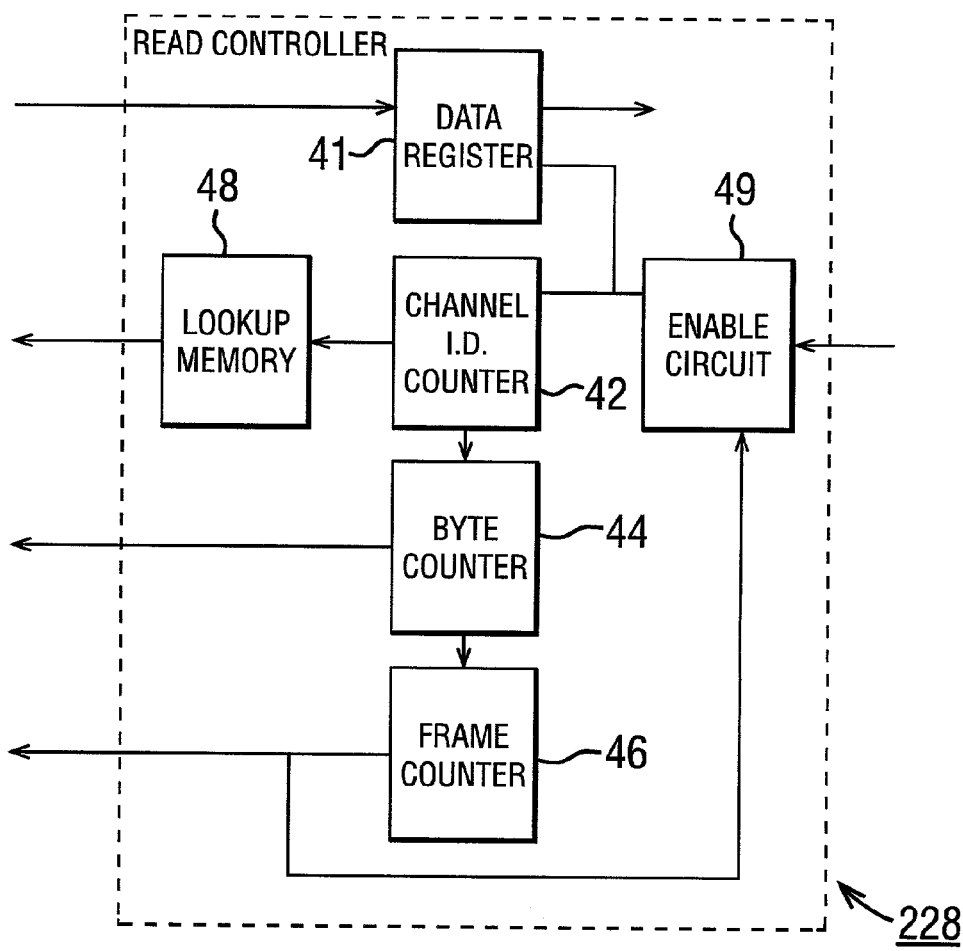
FIG. 4 shows a read controller according to an illustrative embodiment of the invention.

FIG. 4 shows an illustrative embodiment of read controller 228 according to the principles of the invention. As shown, read controller 228 includes data register 41, channel ID counter 42, byte counter 44, frame counter 46, lookup memory 48, and enable circuit 49. Channel ID counter 42 has an overflow output coupled to byte counter 44 and byte counter 44 has an overflow output coupled to frame counter 46. Enable circuit 49 receives inputs from the differential delay controller (not shown) and frame counter 46. Enable circuit 49 feeds a clock signal to channel ID counter 42. Channel ID counter 42 has an output coupled to an address input of lookup memory 48. Lookup memory 48, byte counter 44, and frame counter 46 have outputs coupled to access multiplexer 224 (not shown).

In operation, enable circuit 49 passes the clock signal when the differential delay controller signals that bytes of the frame indicated by frame counter 48 have been received from all channels. In this case, channel ID counter 42 counts through all channels. Channel ID counter 42 feeds a channel ID to lookup memory 48, which, in response, retrieves the base address for the channel and feeds this address to access multiplexer 224. When channel ID counter 42 has counted through all channels, it causes byte counter 44 to increment. Similarly, when byte counter 44 has counted through all bytes in a container, it causes frame counter 46 to increment.

The outputs of lookup memory 48, byte counter 44 and frame counter 46 are used to address RAM 222 memory in the same way as write controllers 220a–220g. The output of lookup memory 48 and byte counter 44 are added to form one part of the bits of the address for RAM memory 222 and the output of frame counter 46 forms a further part of the bits of the address.

It will be appreciated that the invention is not limited to the described embodiment. Many alternative embodiments are possible, for example, the path termination units 20a–20g, which are shown as separate units for each channel may actually be implemented as a smaller number of units or even a single unit, which outputs bytes for different channels in time share multiplexing. Their function may be implemented using a suitably programmed FPGA (Field Programmable Gate Array).

Similarly, write controllers 220a–220g may be time-shared. In this case, their structure may be similar to that of read controller 228. One may use, for example, a lookup memory that stores base addresses, from which the base address for the current channel is retrieved by addressing this lookup memory with a channel ID number. When timeshare multiplexed channels are used, the channel ID may be determined by a channel ID counter, which is incremented every time a byte from a new channel is processed. A memory storing byte counter values (addressed by the channel ID) may be provided when the byte count value differs for different channels, or a common byte counter may be used for all channels in case the byte count is the same for all channels. In this case, the byte counter is incremented when a byte from all channels has been written. Similarly, a memory storing frame counter values (addressed by the channel ID) may be provided to provide the part of the frame address. The content of this memory for an ID is incremented when the byte counter value overflows.

The adder 225 may be included in the write controller (e.g., in front of the multiplexer 224). In this case, and if multiple write controllers are used, each write controller will have its own adder. The lookup memory may be implemented as a ROM or RAM memory or as an FPGA circuit, and so on.

Cross connect unit 120 may be a programmable unit, containing a program that controls how many and which channels are fed to which interface unit 122 and 124. Preferably, RAM memory is a dedicated (external) RAM IC, or a plurality of such IC's, specific IC's being selected by a part of the address.

Although the invention has been illustrated for a 1 gigabit per second interface, it will be appreciated that a similar technique can be applied to interfaces of R gigabits per second, where R is a power of two: R=2**M (M integer and M>0). In this case, R times 7 or 21 streams of containers will be used for SDH and SONET, respectively.

In this case, the M least significant bits of the channel ID may be used directly as address bits for the RAM memory 222 (i.e. without addition to the byte counter), maintaining the same efficient use of memory as in the case of the 1 gigabit per second data rate. The higher significant bits of the channel ID can be used to select a base address, as described for the 1 gigabit per second case, which is arithmetically added to the byte count value. The M least significant bits may be stored in ID register 31 and fed to RAM memory 222 via access multiplexer 224 but not passing through adder 225. Similarly, the M least significant bits may be fed from channel ID counter 42 around lookup memory 48 to access circuit 224.

Although memory 222 has been shown as a single addressable memory, it may also be implemented as a number of memories, each for a different value (or a set of different values) of the least significant bits of the channel ID. In this case, write controllers 220 for channel IDs that correspond to different memories are connected to the memory for their significant bit value only, via an access multiplexer for that memory. This reduces the maximum data rate to and from the memories. In this case, no explicit addressing with the least significant bits of the channel ID is necessary.

Accordingly, the foregoing embodiments are merely illustrative of the principles of the invention. Those skilled in the art will be able to devise numerous arrangements, which, although not explicitly shown or described herein, nevertheless embody those principles that are within the scope of the invention. Accordingly, the scope of the invention is limited only by the claims appended hereto.

What is claimed is:

1. A method of transporting a data stream over a synchronous network using virtual concatenation, the data stream having a bit rate of R gigabits per second, R being equal to an integer power of 2, the method comprising:

allocating R times a prescribed number of channels for transmitting streams of containers over the network;
splitting the data stream into blocks;
distributing bytes of each block over a group of containers of two or more channels;

transporting the containers over the network; and upon receiving the containers from the channels, storing information from the containers in a memory for retrieval once bytes from all containers for the block have been received, wherein the memory is addressed with an address having a first set of bits determined by a position of the container in the stream of containers and a second set of bits determined from an offset determined by a position of the information in the container added to a base address for a channel from which the container was received, and wherein base addresses for a set of the prescribed number of channels are spaced by an address distance equal to the minimum range needed for storing a container in the memory, wherein the bit rate being 2 to the power M, where M is a positive integer, M least significant bits of a channel ID being used directly as address bits for the memory, the base addresses being used for respective sets of the prescribed number of channels, each set corresponding to a respective value of the M least significant bits of the channel ID, which value is shared by the channels in the set.

2. The method according to claim 1, wherein the synchronous network is an SDH-type network and wherein the prescribed number of channels is 7 channels.

3. The method according to claim 1, wherein the synchronous network is a SONET-type network and wherein the prescribed number of channels is 21 channels.

4. A method of receiving a data stream transported over a synchronous network using virtual concatenation, the data stream having a bit rate of R gigabits per second, R being equal to an integer power of 2, the method comprising:

receiving containers from R times a prescribed number of channels, the containers including bytes from a block in the data stream; and storing information from the containers in a memory for retrieval once bytes from all containers for the block have been received, the memory being addressed with an address having a first set of bits determined by a position of the container in the stream of containers and a second set of bits determined from an offset determined by a position of the information in the container added to a base address for a channel from which the container was received, base addresses for a set of the prescribed number of channels being spaced by an address distance equal to the minimum range needed for storing a container in the memory, wherein the bit rate being 2 to the power M, where M is a positive integer, M least significant bits of a channel ID being used for directly as address bits for the memory, the base addresses being used for respective sets of the prescribed number of channels, each set corresponding to a respective value of the M least significant bits of the channel ID, which value is shared by the channels in the set.

5. The method according to claim 4, wherein the synchronous network is an SDH-type network and herein the prescribed number of channels is 7 channels.

6. The method according to claim 4, wherein the synchronous network is a SONET-type network and herein the prescribed number of channels is 21 channels.

7. A telephone network comprising a circuit for receiving a data stream transported over a synchronous network using virtual concatenation, the data stream having a bit rate of R gigabits per second, R being equal to an integer power of 2, the circuit comprising:

an input for receiving containers from R times a prescribed number of channels, the containers containing bytes from a block in the data stream;

a memory for storing information from the containers for retrieval once bytes from all containers from the block have been received; and an addressing unit for addressing the memory with an address having a first set of bits determined by a position of the container in the stream of containers and a second set of bits determined from an offset determined by a position of the information in the container added to a base address for a channel from which the container was received, base addresses for a set of the prescribed number of channels being spaced by an address distance equal to the minimum range needed for storing a container in the memory, wherein the bit rate being 2 to the power M, where M is a positive integer, M least significant bits of a channel ID being used directly as address bits for the memory, the base addresses being used for respective sets of the prescribed number of channels, each set corresponding to a respective value of the M least significant bits of the channel ID, which value is shared by the channels in the set.

8. The network according to claim 7, wherein the synchronous network is an SDH-type network and wherein the prescribed number of channels is 7 channels.

9. The network according to claim 7, wherein the synchronous network is a SONET-type network and wherein the prescribed number of channels is 21 channels.

10. A circuit pack for use in a telephone exchange, for receiving a data stream transported over a synchronous network using virtual concatenation, the data stream having a bit rate of R gigabits per second, R being equal to an integer power of 2, the circuit pack comprising:

an input for receiving containers from R times a prescribed number of channels, the containers containing bytes from a block in the data stream;

a memory for storing information from the containers for retrieval once bytes from all containers of the blocks have been received; and an addressing unit for addressing the memory with an address having a first set of bits determined by a position of the container in the stream of containers and a second set of bits determined from an offset determined by a position of the information in the container added to a base address for a channel from which the container was received, base addresses for a set of the prescribed number of channels being spaced by an address distance equal to the minimum range needed for storing a container in the memory, wherein the bit rate being 2 to the power M, where M is a positive integer, M least significant bits of a channel ID being used directly as address bits for the memory, the base addresses being used for respective sets of the prescribed number of channels, each set corresponding to a respective value of the M least significant bits of the channel ID, which value is shared by the channels in the set.

11. The circuit pack according to claim 10, wherein the synchronous network is an SDH-type network and wherein the prescribed number of channels is 7 channels.

12. The circuit pack according to claim 10, wherein the synchronous network is a SONET-type network and wherein the prescribed number of channels is 21 channels.

13. A telephone exchange comprising a circuit for receiving a data stream transported over a synchronous network using virtual concatenation, the data stream having a bit rate of R gigabits per second, R being equal to an integer power of 2, the circuit comprising:

an input for receiving containers from R times a prescribed number of channels, the containers containing bytes from a block in the data stream;

a memory for storing information from the containers for retrieval once bytes from all containers from the block have been received; and an addressing unit for addressing the memory with an address having a first set of bits determined by a position of the container in the stream of containers and a second set of bits determined from an offset determined by a position of the information in the container added to a base address for a channel from which the container was received, base addresses for a set of the prescribed number of channels being spaced by an address distance equal to the minimum range needed for storing a container in the memory, wherein the bit rate being 2 to the power M, where M is a positive integer, M least significant bits of a channel ID being used directly as address bits for the memory, the base addresses being used for respective sets of the prescribed number of channels, each set corresponding to a respective value of the M least significant bits of the channel ID which value is shared by the channels in the set.

14. The telephone exchange according to claim 13, wherein the synchronous network is an SDH-type network and wherein the prescribed number of channels is 7 channels.

15. The telephone exchange according to claim 13, wherein the synchronous network is a SONET-type network and wherein the prescribed number of channels is 21 channels.

16. The telephone exchange according to claim 13, the circuit further comprising a lookup memory for the base address under control of an indication of the channel on which the information is received and adding the offset to the base address.

* * * * *